US010988143B2

(12) United States Patent
Cheaz et al.

(10) Patent No.: US 10,988,143 B2
(45) Date of Patent: Apr. 27, 2021

(54) USING CLOUD-BASED TRAFFIC POLICIES TO ALLEVIATE ISSUES WITH CROSS GEOGRAPHIC TRAFFIC IN AUTONOMOUS VEHICLES

(71) Applicant: INTERNATIONAL BUSINESS MACHINES CORPORATION, Armonk, NY (US)

(72) Inventors: Nixon Cheaz, Cary, NC (US); Anthony Diaz, Cary, NC (US); Richard Gebhardt, Raleigh, NC (US); Ashrith Shetty, Belthangady (IN); Rohit Shetty, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 15/686,992

(22) Filed: Aug. 25, 2017

(65) Prior Publication Data
US 2019/0061782 A1    Feb. 28, 2019

(51) Int. Cl.
| | | |
|---|---|---|
| *B60W 50/14* | (2020.01) | |
| *G08G 1/0967* | (2006.01) | |
| *G05D 1/02* | (2020.01) | |
| *B60W 60/00* | (2020.01) | |
| *G05D 1/00* | (2006.01) | |

(52) U.S. Cl.
CPC .......... *B60W 50/14* (2013.01); *B60W 60/005* (2020.02); *G05D 1/021* (2013.01);
(Continued)

(58) Field of Classification Search
CPC ............... B60W 50/14; B60W 60/005; B60W 60/0057; B60W 60/0061; B60W 60/0053;
(Continued)

(56) References Cited

U.S. PATENT DOCUMENTS

| | | | |
|---|---|---|---|
| 2012/0083964 A1* | 4/2012 | Montemerlo ........... | B60T 17/18 701/26 |
| 2015/0309512 A1* | 10/2015 | Cudak .................. | G05D 1/0287 701/23 |

(Continued)

FOREIGN PATENT DOCUMENTS

| | | | | |
|---|---|---|---|---|
| WO | WO-2014148975 A1 * | 9/2014 | ........... | G05D 1/0297 |

OTHER PUBLICATIONS

Mell et al., "The NIST Definition of Cloud Computing," U.S. Department of Commerce, National Institute of Standards and Technology, Sep. 2011, p. 1-7, Special Publication 800-145.

(Continued)

*Primary Examiner* — Abby Y Lin
*Assistant Examiner* — Renee LaRose
(74) *Attorney, Agent, or Firm* — Michael O'Keefe (57) ABSTRACT

According to one embodiment, a method, computer system, and computer program product for cloud integration for autonomous vehicles is provided. An embodiment may include receiving a location for the autonomous vehicle from a global positioning system, may also include determining a rule area in which the autonomous vehicle is located based on the received location, may include identifying a traffic rule set associated with the determined rule area, may also include, in response to determining that the identified traffic rule set is not available for the determined rule area, transmitting a manual mode alert to a user, and may include enabling a manual mode in the autonomous vehicle.

20 Claims, 6 Drawing Sheets

(52) U.S. Cl.
CPC ... *G08G 1/09675* (2013.01); *G08G 1/096716* (2013.01); *G08G 1/096725* (2013.01); *G08G 1/096741* (2013.01); *G08G 1/096766* (2013.01); *G08G 1/096775* (2013.01); *B60W 2050/143* (2013.01); *B60W 2555/60* (2020.02); *B60W 2556/60* (2020.02); *B60W 2900/00* (2013.01); *G05D 1/0088* (2013.01)

(58) Field of Classification Search
CPC ........ B60W 60/0054; G08G 1/096725; G08G 1/096766
See application file for complete search history.

(56) References Cited

U.S. PATENT DOCUMENTS

| | | | |
|---|---|---|---|
| 2016/0180707 A1 | 6/2016 | Macneille et al. | |
| 2016/0355192 A1* | 12/2016 | James | B60W 50/082 |
| 2017/0066452 A1* | 3/2017 | Scofield | B60W 50/14 |
| 2017/0067385 A1 | 3/2017 | Hunt | |
| 2018/0364715 A1* | 12/2018 | Greenberger | G05D 1/0088 |

OTHER PUBLICATIONS

Bruce, "Google patents turn signal detector for autonomous cars", Autoblog, https://www.autoblog.com/2016/04/11/google-patents-turn-signal-identification-autonomous-cars/, Apr. 11, 2016, pp. 1-10.
Chang, "Your self-driving Google car will know when the police are approaching", Digital Trends, hltps://www.digitaltrends.com/cars/self-driving-car-police-detection/, Sep. 6, 2016, pp. 1-6.
Novatel, "High-Precision GPS for Autonomous Vehicles", https://www.novatel.com/industries/autonomous-vehicles/#overview, accessed Aug. 16, 2017, p. 1.
Sanborn, "Highly Automated Driving (HAD) Maps for Autonomous Vehicles", Maps for Self-Driving Cars | Maps for Automated Driving, http://www.sanborn.com/highly-automated-driving-maps-for-autonomous-vehicles/, accessed Aug. 16, 2017, p. 1-5.

* cited by examiner

USING CLOUD-BASED TRAFFIC POLICIES TO ALLEVIATE ISSUES WITH CROSS GEOGRAPHIC TRAFFIC IN AUTONOMOUS VEHICLES

BACKGROUND

The present invention relates, generally, to the field of computing, and more particularly to autonomous vehicles.

Autonomous vehicles are vehicles that are able to navigate without human intervention using sensors to guide the performance of driving tasks. Employing an autonomous vehicle capable of sensing the surrounding environment and navigating without human input has the potential to decrease the human errors that lead to automobile accidents, since many automobile accidents can be attributed to some form of human error, such as delayed reaction time, tailgating, rubbernecking, and other forms of distracted or aggressive driving. Autonomous vehicles rely heavily on cloud computing integration to communicate with each other to avoid accidents, download up-to-date maps and traffic data, and to create efficient routes to a driver's destination.

SUMMARY

According to one embodiment, a method, computer system, and computer program product for cloud integration for autonomous vehicles is provided. An embodiment may include receiving a location for the autonomous vehicle from a global positioning system, may also include determining a rule area in which the autonomous vehicle is located based on the received location, may include identifying a traffic rule set associated with the determined rule area, may also include, in response to determining that the identified traffic rule set is not available for the determined rule area, transmitting a manual mode alert to a user, and may include enabling a manual mode in the autonomous vehicle.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to autonomous vehicles. The following described exemplary embodiments provide a system, method, and program product to, among other things, integrate traffic rules into the knowledge base of an autonomous vehicle and switch into a manual mode should the traffic rules for a newly entered area not be available. Therefore, the present embodiment has the capacity to improve the technical field of autonomous vehicles by ensuring that autonomous vehicles comply with all applicable traffic rules and regulations for a given area and, furthermore, preventing the autonomous function of a vehicle in areas where the previously described capabilities are prohibited.

As previously described, autonomous vehicles are vehicles that are able to navigate without human intervention using sensors to guide the performance of driving tasks. Employing an autonomous vehicle capable of sensing the surrounding environment and navigating without human input has the potential to decrease the human errors that lead to automobile accidents since many automobile accidents can be attributed to some form of human error, such as delayed reaction time, tailgating, rubbernecking, and other forms of distracted or aggressive driving. Autonomous vehicles rely heavily on cloud computing integration to communicate with each other to avoid accidents, download up-to-date maps and traffic data, and to create efficient routes to a driver's destination.

The rules governing automobiles and driving can change between states and even between regions. For example, the speed limit in state A might be fifty miles per hour, but the speed limit in neighboring state B might be sixty miles per hour. Even the slightest change in a rule can cause a problem for the user of an autonomous vehicle. For instance, the use of autonomous systems for driving might be banned in certain states and might be subject to special restrictions in certain areas. In other situations, the driving rules themselves, such as speed limit or right-turn-on-red rules, can change based on location. These variations in rules can hinder the use of autonomous vehicles and might create dangerous situations for users of autonomous vehicles. As the use of autonomous vehicles becomes more widespread, the knowledge base of the system must take the legal aspects of driving into account. As such, it may be advantageous to, among other things, implement a system capable of integrating traffic rules into the knowledge base of an autonomous vehicle and switching into a manual mode should the traffic rules for a newly entered area not be available or the use of autonomous functionality be prohibited.

According to one embodiment, an autonomous vehicle may be able to use a Global Positioning System (GPS) and mapping technology to determine the coordinates of the autonomous vehicle. The autonomous vehicle may be able to access a repository that can store a map of predefined rule areas and can use the autonomous vehicle's coordinates to determine in which rule area the autonomous vehicle is located. The boundaries of a rule area may be defined by a set of coordinates, such as geographic coordinates. The traffic rules for each rule area may be stored in a central repository and may be downloaded by the autonomous vehicle as needed. The autonomous vehicle may apply the traffic rules such that the vehicle can operate within the legal traffic parameters of the rule area, such as speed limits, right-turn-on-red rules, and rules governing headlights. The traffic rules may be applied hierarchically based on priority, beginning first with the most local set of rules available. When there are no traffic rules for a rule area in the repository, or if the traffic rules indicate that autonomous cars are prohibited in that rule area, the autonomous vehicle may transmit a manual mode alert the user and switch the car to manual mode.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to incorporate the traffic rules from different geographical areas into the operating system of an autonomous vehicle and switch the autonomous vehicle into a manual mode when such traffic rules are unavailable.

Figure 1:
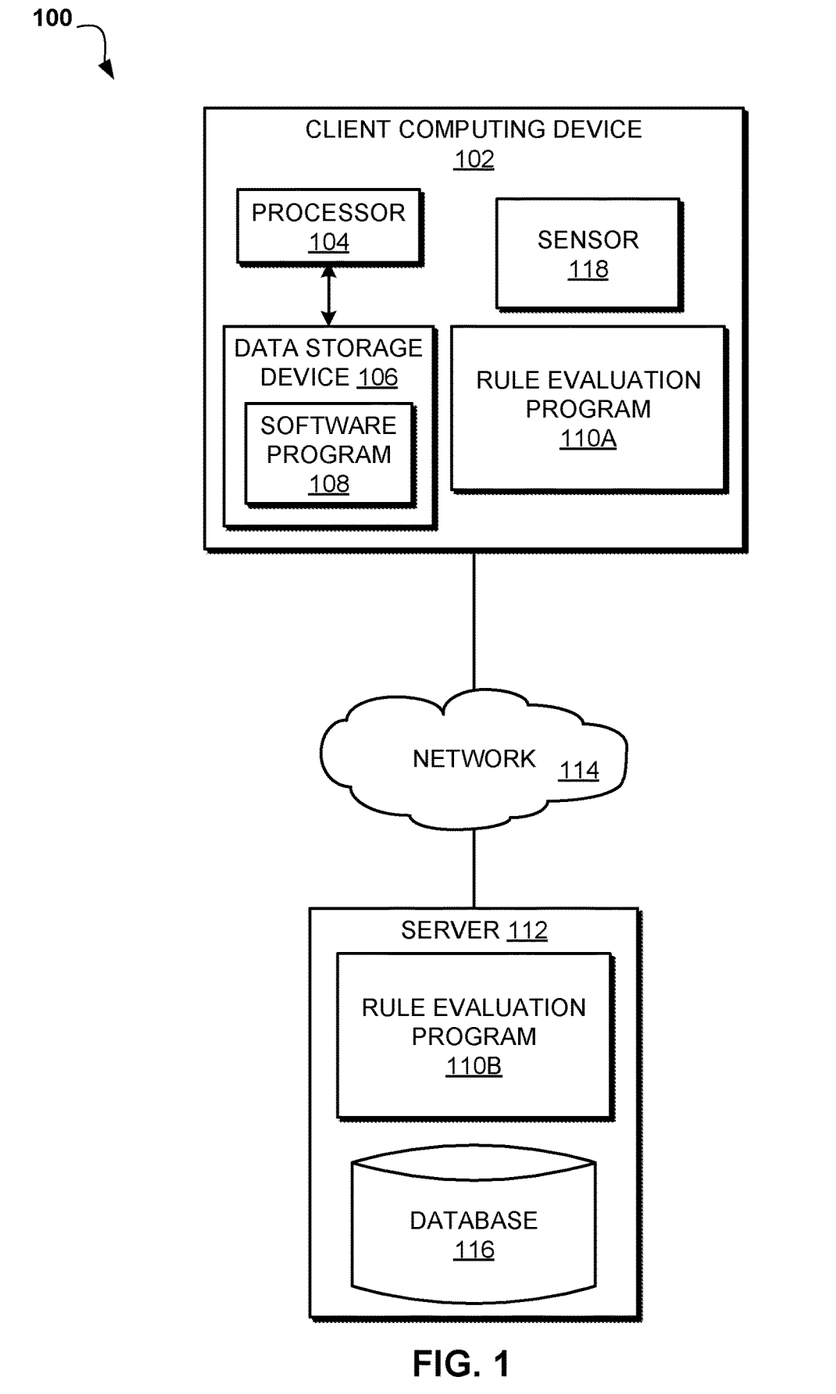
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a rule evaluation program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, an automobile computer system, or any type of computing device capable of running a program and accessing a network. As will be discussed with reference to FIG. 3, the client computing device 102 may include internal components 302 and external components 304, respectively.

The server computer 112 may be a laptop computer, netbook computer, personal computer (PC), a desktop computer, or any programmable electronic device or any network of programmable electronic devices capable of hosting and running a rule evaluation program 110B and a database 116 and communicating with the client computing device 102 via the communication network 114, in accordance with embodiments of the invention. As will be discussed with reference to FIG. 3, the server computer 112 may include internal components 302 and external components 304, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The database 116 may be a data repository that stores a plurality of traffic rules for different geographical locations. The traffic rules may be stored according to a geographic location within a region of a preconfigured size. For instance, the traffic rules might be stored in square-mile sized blocks, or rule areas. The traffic rules in each rule area may be stored based on the type and subject of the traffic rule. The types of traffic rules may include traffic rules for a particular road, town traffic rules, county traffic rules, and/or state traffic rules. The subjects of the traffic rules may include speed limits, right-turn-on-red rules, carpool lane rules, headlight rules, vehicle weight and/or dimension limits, parking rules, and idling rules. A traffic rule may also prohibit or restrict the use of autonomous cars within a rule area.

The sensor 118 may be a device that detects or measures a physical property and records, indicates, or otherwise responds to the physical property. The sensor 118 may be a global positioning system (GPS), a radio detection and ranging device (radar), a laser, an inertial measurement unit, or a camera.

According to the present embodiment, the rule evaluation program 110A, 110B may be a program capable of applying traffic rules received from a database to the operation of an autonomous vehicle and switching the autonomous vehicle into a manual mode when appropriate. The rule evaluation method is explained in further detail below with respect to FIG. 2.

Figure 2:
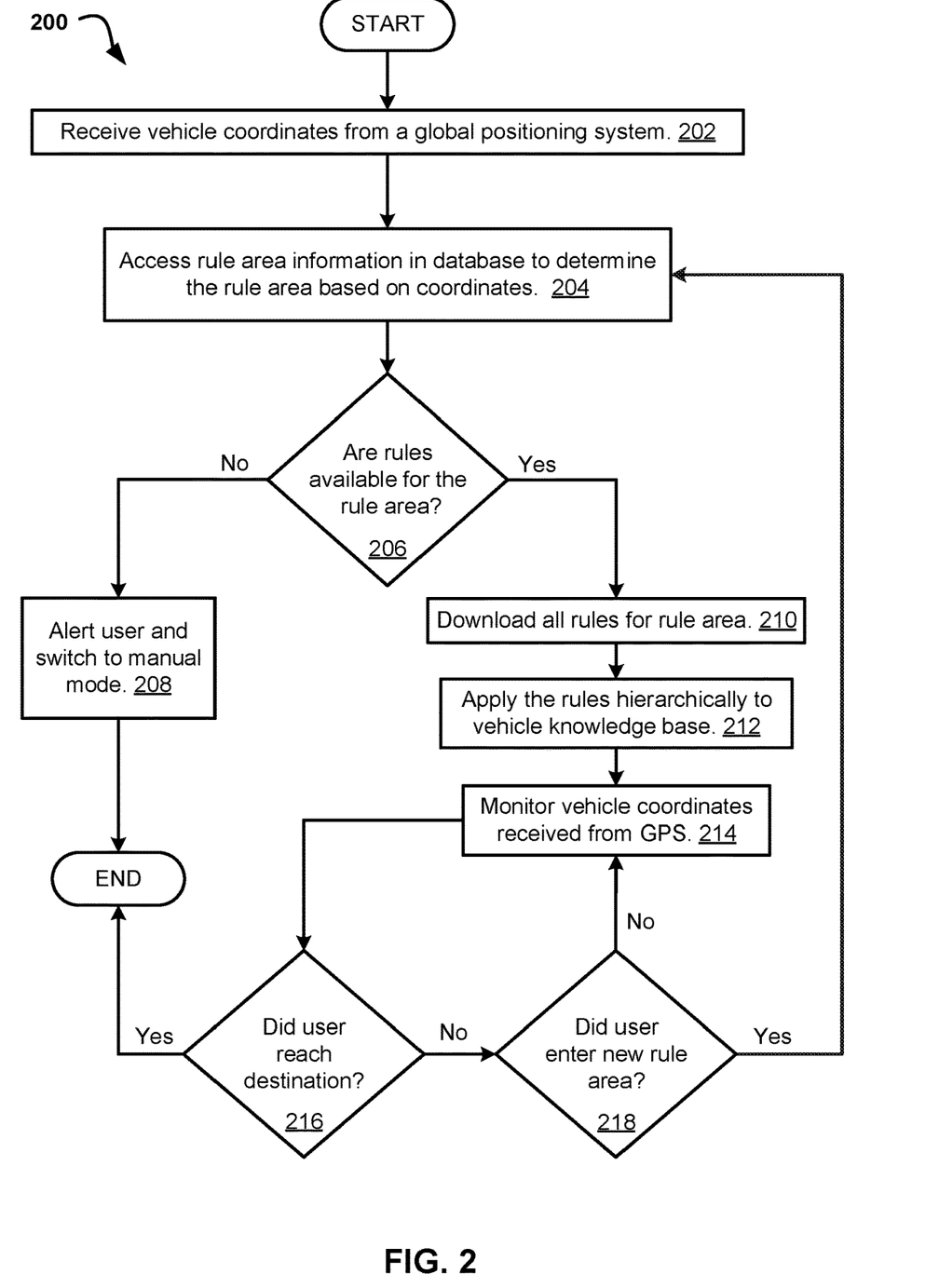
FIG. 2 is an operational flowchart illustrating a rule evaluation process according to at least one embodiment.

Referring now to FIG. 2, an operational flowchart illustrating a rule evaluation process 200 is depicted according to at least one embodiment. At 202, the rule evaluation program 110A, 110B receives geographical coordinates of the autonomous vehicle from a global positioning system (GPS). For example, if the autonomous vehicle is at the Empire State Building, the GPS may determine the location of the autonomous vehicle has the coordinates "40.7484° N, 73.9857° W". The rule evaluation program 110A, 110B may receive the coordinates from the GPS and may store the coordinates in a repository, such as data storage device 106 or the database 116.

Next, at 204, the rule evaluation program 110A, 110B accesses rule area information from the database 116 to determine the rule area that the autonomous vehicle is located in based on the coordinates received from the GPS. A rule area may be a geographic region of a preconfigured size with a boundary defined by a set of coordinates. For instance, rule areas may be separated into square-mile sized blocks. Additionally, the rule areas may be separated into areas with boundaries consistent with the boundaries of a town, city, or county. As previously described, the database 116 may be a repository that stores a plurality of traffic rules according to geographic location within a region of a preconfigured size. The stored traffic rules may include regional traffic rules, speed limits, and rules about the use of autonomous vehicles. The rule evaluation program 110A, 110B may determine in which rule area the autonomous vehicle is present based on the coordinates received from the GPS.

Then, at 206 the rule evaluation program 110A, 110B determines whether the traffic rules are available for the rule area that the autonomous vehicle is in. The rule evaluation program 110A, 110B may search the database 116 for all available traffic rules for the rule area including, but not limited to, traffic rules for a particular road, town traffic rules, county traffic rules, and/or state traffic rules. According to one implementation, the method may continue along the operational flowchart 200, if there are traffic rules available in the database 116 for the rule area in which the autonomous vehicle is located. If the rule evaluation program 110A, 110B determines that there are traffic rules available in the database 116 for the rule area in which the autonomous vehicle is located (step 206, "Yes" branch), the rule evaluation program 110A, 110B may continue to step 210 to download all the traffic rules for that rule area. If the rule evaluation program 110A, 110B determines that there are no traffic rules available in the database 116 for the rule area in which the autonomous vehicle is located (step 206, "No" branch), the rule evaluation program 110A, 110B may continue to step 208 to automatically switch the vehicle to manual mode at a preconfigured time after transmitting a manual mode alert to the user.

Next, at 208, the rule evaluation program 110A, 110B transmits a manual mode alert to the user that the autonomous vehicle will switch to a manual mode at a preconfigured time before the switch to, or enablement of, manual mode occurs. The manual mode alert could be, but is not limited to, a verbal alert on the vehicle speakers, a visual alert on the vehicle dashboard, or another type of alert. In an alternate embodiment, the rule evaluation program 110A, 110B may alert the user to physically switch the autonomous vehicle into manual mode. The rule evaluation program 110A, 110B may terminate when the autonomous vehicle is switched to manual mode.

Next, at 210, the rule evaluation program 110A, 110B downloads all the traffic rules for the rule area in which the autonomous vehicle is located. As previously described, the traffic rules for the rule area may include traffic rules for a particular road, town traffic rules, county traffic rules, and/or state traffic rules. The subjects of the traffic rules may include speed limits, right-turn-on-red rules, carpool lane rules, headlight rules, vehicle weight and/or dimension limits, parking rules, and idling rules. In an alternate embodiment, the rule evaluation program 110A, 110B may also download the traffic rules for the rule areas surrounding the rule area in which the autonomous vehicle is located. By downloading the traffic rules for the surrounding rule areas, the rule evaluation program 110A, 110B may be able to predict the traffic rules for whichever rule area the autonomous vehicle enters next. For example, when the autonomous vehicle is in Manhattan, N.Y. at the Empire State Building, the rule evaluation program 110A, 110B may download the traffic rules for each of the surrounding boroughs. This ensures that the rule evaluation program 110A, 110B may be prepared to apply the traffic rules on whichever route the autonomous car drives. In the situation where autonomous vehicles are prohibited in an approaching rule area, the rule evaluation program 110A, 110B may automatically switch the autonomous vehicle into manual mode after transmitting a manual mode alert to the user at an earlier time. As previously described, the manual mode alert may be a verbal alert on the vehicle speakers, a visual alert on the vehicle dashboard or heads-up display, or another type of alert that adequately notifies the user. In an alternate embodiment, the rule evaluation program 110A, 110B may be able to predict that the autonomous vehicle will enter a rule area that restricts or prohibits the use of autonomous vehicles and may be able to instruct the GPS to reroute the user through a rule area that permits autonomous vehicles. For example, if the autonomous vehicle is approaching rule area A, which prohibits the use of autonomous vehicles, the rule evaluation program 110A, 110B may instruct the GPS to reroute the user around rule area A and through rule area B, which permits the use of autonomous vehicles. By rerouting the user away from rule areas that prohibit or restrict the use of autonomous vehicles, the rule evaluation program 110A, 110B may be able to minimize the number of times the autonomous vehicle must be switched into manual mode.

Next, at 212, the rule evaluation program 110A, 110B applies the traffic rules hierarchically. Hierarchically may mean that the different types of traffic rules are ranked according to the priority of the rule. Hierarchically, the priority of a town traffic rule might be greater than the priority for a state traffic rule. For instance, the rule evaluation program 110A, 110B may first apply the traffic rules for the particular road on which the autonomous vehicle is traveling. When the traffic rules for a road are not available in the database 116, the rule evaluation program 110A, 110B may apply the town traffic rules. When the town traffic rules are not available in the database 116, the rule evaluation program 110A, 110B may apply the county traffic rules. Finally, when the county traffic rules are not available in the database 116, the rule evaluation program 110A, 110B may apply the state traffic rules. For example, if the autonomous vehicle enters a new town but the traffic rules are not available for the town in the database 116, the rule evaluation program 110A, 110B may apply the traffic rules for the county or the state. However, if the traffic rules for both the town and the county are available in the database 116, the rule evaluation program 110A, 110B may apply the town traffic rules. In an alternate embodiment, the rule evaluation program 110A, 110B may be able to determine that the most restrictive traffic rule can preempt other available traffic rules. For instance, if the state speed limit on town roads is thirty miles per hour, but the town speed limit on town roads is twenty-five miles per hour, the rule evaluation program 110A, 110B may apply the town speed limit, which is more restrictive than the state speed limit. Additionally, traffic rules for some rule areas might restrict the use of autonomous vehicles or prohibit the use of autonomous vehicles entirely. In such situations, the rule evaluation program 110A, 110B may apply the previously described traffic rules by automatically switching the vehicle into manual mode at a preconfigured time after transmitting a manual mode alert to the user. As previously described, the manual mode alert could be, but is not limited to, a verbal alert on the vehicle speakers, a visual alert on the vehicle dashboard or heads-up display, or another type of alert that adequately notifies the user. In an alternate embodiment, the rule evaluation program 110A, 110B may alert the user to physically switch the autonomous vehicle into manual mode.

Next, at 214, the rule evaluation program 110A, 110B monitors the coordinates of the autonomous vehicle received from the GPS. The rule evaluation program 110A, 110B may monitor the location of the autonomous vehicle to determine whether the autonomous vehicle has reached the destination specified by the user. Additionally, the rule evaluation program 110A, 110B may monitor the location of the autonomous vehicle to determine whether the autonomous vehicle has entered a new rule area.

Then, at 216, the rule evaluation program 110A, 110B determines whether the user has reached the destination. For example, if the user inputs "10 Main Street" as the destination, the rule evaluation program 110A, 110B may monitor the coordinates of the autonomous vehicle received from the GPS to determine whether the autonomous vehicle has arrived at "10 Main Street". According to one implementation, the method may continue along the operational flowchart 200, if the user has reached the destination. If the rule evaluation program 110A, 110B determines that the user has reached the destination (step 216, "Yes" branch), the rule evaluation program 110A, 110B may terminate. If the rule evaluation program 110A, 110B determines that the user has not reached the destination (step 216, "No" branch), the rule evaluation program 110A, 110B may continue to step 218 to determine whether the user has entered a new rule area.

Then, at 218, the rule evaluation program 110A, 110B determines whether the user has entered a new rule area. The rule evaluation program 110A, 110B may determine whether the user has entered a new rule area by monitoring the autonomous vehicle's coordinates on the GPS. A user may have entered a new rule area if the GPS reports the autonomous vehicle's coordinates as outside the original rule area. According to one implementation, the method may continue along the operational flowchart 200, if the user has entered a new rule area. If the rule evaluation program 110A, 110B determines that the user has entered a new rule area (step 218, "Yes" branch), the rule evaluation program 110A, 110B may return to step 204 to access the rule area information in the database 116, to determine the rule area in which the autonomous vehicle is located based on the received coordinates, and repeat the steps of the operational flowchart 200. If the rule evaluation program 110A, 110B determines that the user did not enter a new rule area, the rule evaluation program 110A, 110B may return to step 214 to monitor the coordinates of the autonomous vehicle received from the GPS.

It may be appreciated that FIG. 2 provides only an illustration of one implementation and does not imply any limitations with regard to how different embodiments may be implemented. Many modifications to the depicted environments may be made based on design and implementation requirements.

Figure 3:
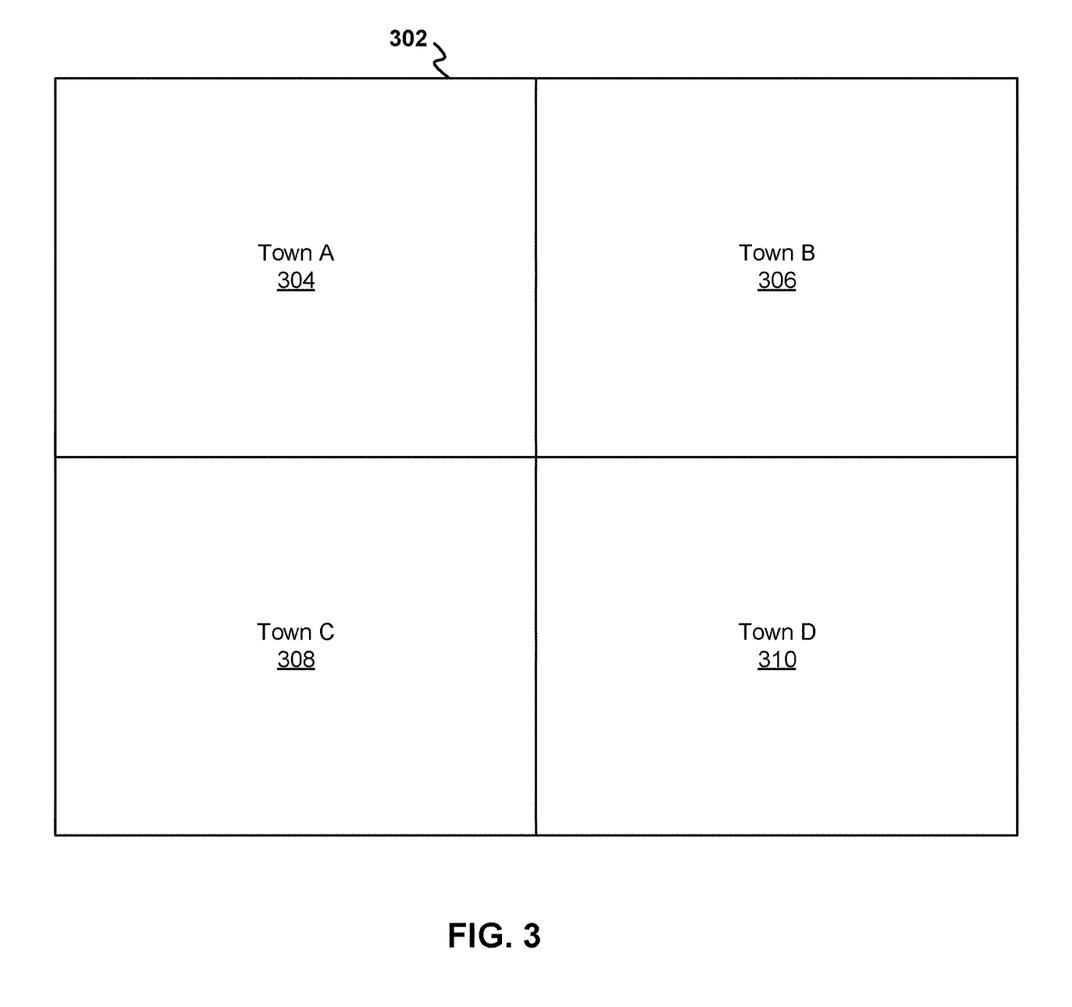
FIG. 3 is a functional block diagram of a rule area according to at least one embodiment.

Referring now to FIG. 3, a functional block diagram of a rule area is depicted, according to at least one embodiment. A user may utilize an autonomous vehicle across various roadways through a county 302 that includes Town A 304, Town B 306, Town C 308, and Town D 310. Each town 304-310 may be defined as a separate rule area since traffic rules between each town 304-310 may vary. As previously described, when an autonomous vehicle is in a rule area, the rule evaluation program 110A, 110B may determine traffic rules for surrounding rule areas. For example, if the autonomous vehicle is traversing roadways through Town A 304, the autonomous vehicle may identify and download the traffic rules for Town B 306, Town C 308, and Town D 310 since the user may be likely to travel to Town B 306, Town C 308, and Town D 310 shortly. Knowledge of the traffic rules of the adjacent rule areas (i.e., Town B 306, Town C 308, and Town D 310) may be beneficial for the performance of the rule evaluation program 110A, 110B when the user does travel to an adjacent rule area. For example, Town A 304 may have a maximum speed limit of 65 miles per hour and Town B 306 may have a maximum speed limit of 55 miles per hour. Therefore, when the autonomous vehicle traverses to Town B 306 from Town A 304, the rule evaluation program 110A, 110B may understand that the vehicle's speed will require a reduction in the maximum allowable speed. Similarly, if Town C 308 prohibits the user of autonomous vehicles, the rule evaluation program 110A, 110B may disengage all autonomous functionality when the autonomous vehicle travels from Town A 304 to Town C 308.

Figure 4:
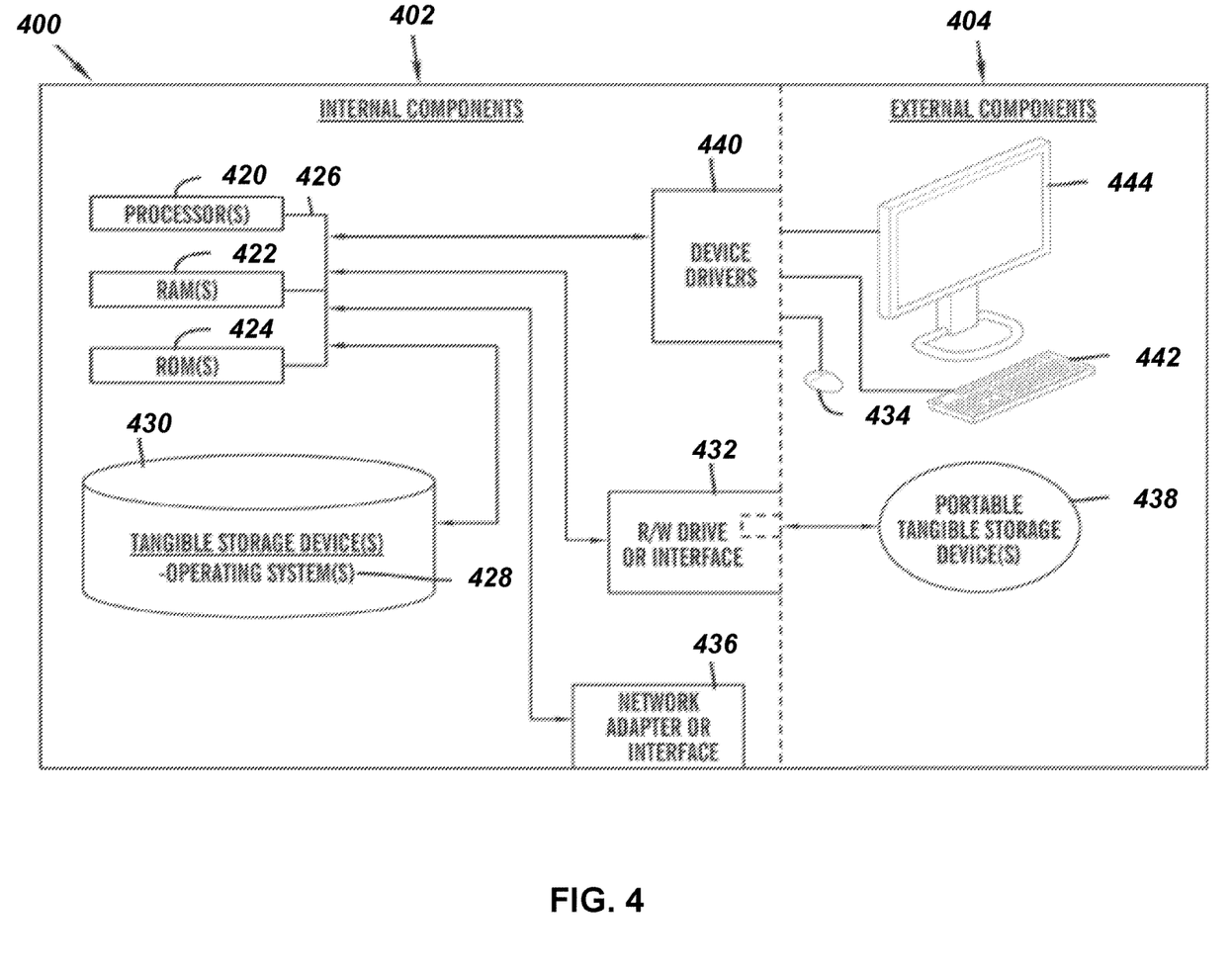
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, automobile computer systems, and distributed cloud computing environments that include any of the above systems or devices.

The client computing device 102 and the server 112 may include respective sets of internal components 402 and external components 404 illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the rule evaluation program 110A in the client computing device 102 and the rule evaluation program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 also includes a R/W drive or interface 432 to read from and write to one or more portable computer-readable tangible storage devices 338 such as a CD-ROM, DVD, memory stick, magnetic tape, magnetic disk, optical disk or semiconductor storage device. A software program, such as the rule evaluation program 110A, 110B, can be stored on one or more of the respective portable computer-readable tangible storage devices 438, read via the respective R/W drive or interface 432, and loaded into the respective hard drive 430.

Each set of internal components 402 also includes network adapters or interfaces 436 such as a TCP/IP adapter cards, wireless Wi-Fi interface cards, or 3G or 4G wireless interface cards or other wired or wireless communication links. The software program 108 and the rule evaluation program 110A in the client computing device 102 and the rule evaluation program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the rule evaluation program 110A in the client computing device 102 and the rule evaluation program 110B in the server 112 are loaded into the respective hard drive 430. The network may comprise copper wires, optical fibers, wireless transmission, routers, firewalls, switches, gateway computers and/or edge servers.

Each of the sets of external components 404 can include a computer display monitor 444, a keyboard 442, and a computer mouse 434. External components 404 can also include touch screens, virtual keyboards, touch pads, pointing devices, and other human interface devices. Each of the sets of internal components 402 also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
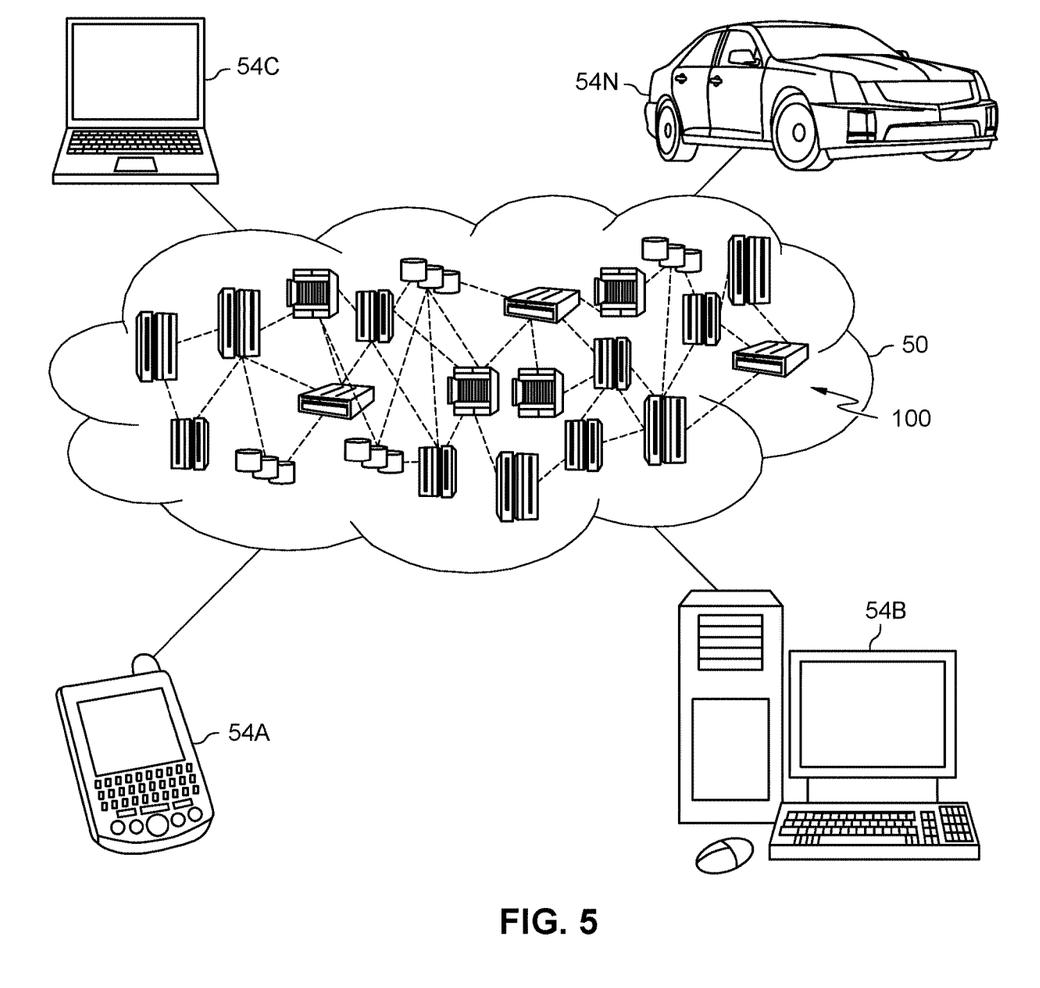
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
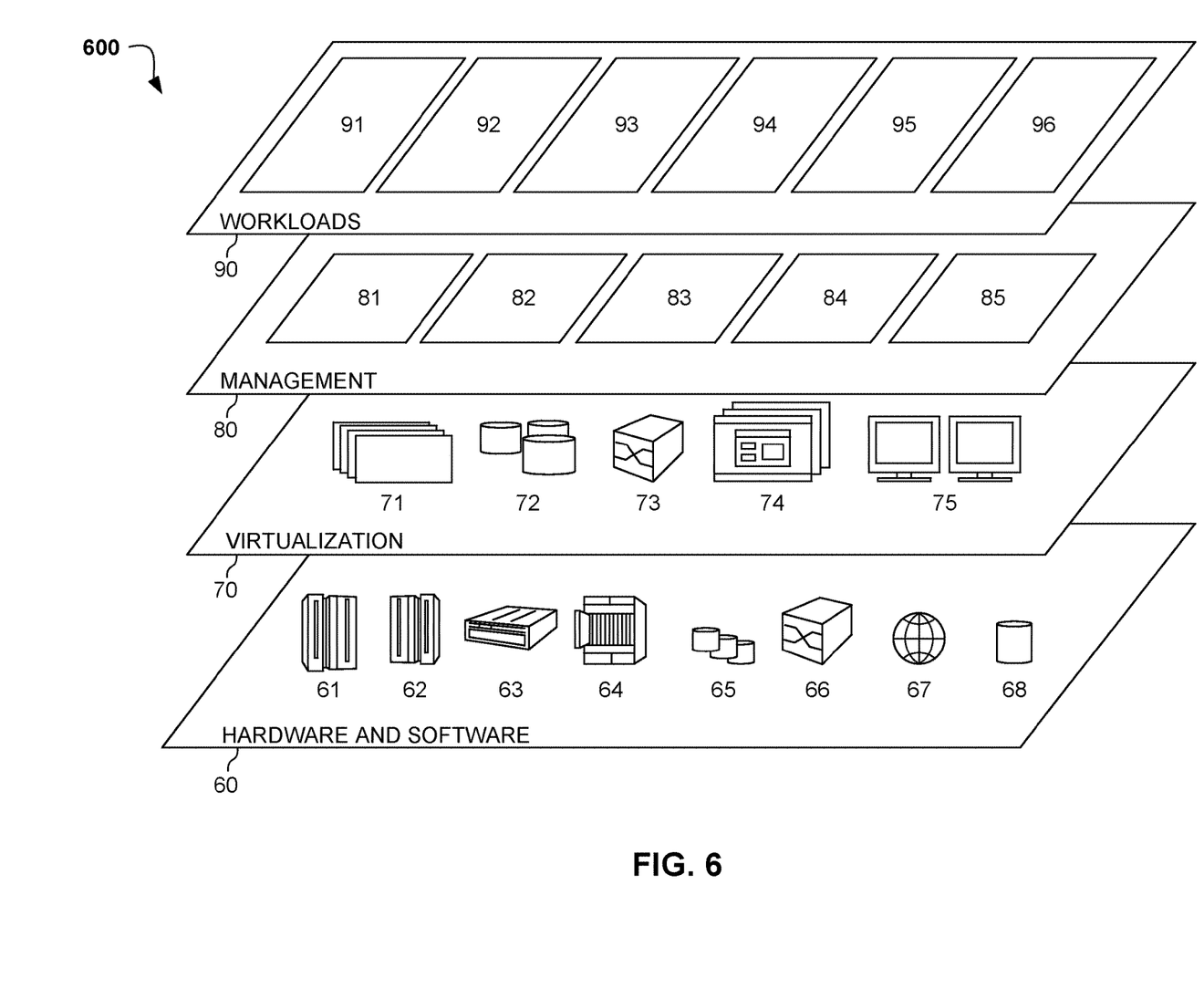
FIG. 6 depicts abstraction model layers according to an embodiment of the present invention.

Referring now to FIG. 6, a set of functional abstraction layers 500 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and rule evaluation 96. Rule evaluation 96 may relate to implementing a system that can integrate traffic rules into the knowledge base of an autonomous vehicle and switch into a manual mode should the traffic rules for a newly entered area not be available The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for incorporating a plurality of cloud-based policies to utilize an autonomous vehicle, the method comprising:

receiving, by the processor, a location for the autonomous vehicle from a global positioning system;

determining a rule area in which the autonomous vehicle is located, wherein the rule area is a geographic region within a municipality based on the received location;

identifying a traffic rule set associated with the determined rule area, wherein the traffic rule set is a plurality of legal traffic parameters for the determined rule area, and wherein the traffic rule set comprises regional traffic rules, speed limits, and rules regarding autonomous vehicle use;

in response to determining that the identified traffic rule set is not available for the determined rule area;

transmitting, to a user device, a manual mode alert to a user in a driver's seat of the autonomous vehicle; and enabling a manual mode in the autonomous vehicle;

in response to determining that the identified traffic rule set is available for the determined rule area:

downloading the identified traffic rule set and an available rule set for each rule area surrounding the determined rule area; and applying the downloaded traffic rule set to a knowledge base in the autonomous vehicle based on a hierarchical priority ranking of traffic laws; and in response to determining the autonomous vehicle has entered a rule area surrounding the determined rule area, applying the available rule set downloaded for the surrounding rule area.

2. The method of claim 1, further comprising:

determining whether the user reached a predetermined destination based on the received location of the autonomous vehicle.

3. The method of claim 2, further comprising:

in response to determining the user did not reach the predetermined destination, determining whether the user entered a new rule area.

4. The method of claim 1, wherein the rule area includes a type, and wherein the type of the rule area is selected from a group consisting of a road, a town, a county, and a state.

5. The method of claim 1, wherein the manual mode alert is selected from a group consisting of a verbal alert on at least one autonomous vehicle speaker, a visual alert on an autonomous vehicle dashboard, and a visual alert on a heads-up display.

6. The method of claim 1, wherein the traffic rule set includes a subject, and wherein the subject of the traffic rule set is selected from a group consisting of a speed limit, a right-turn-on-red rule, a carpool lane rule, a headlight rule, a vehicle weight limit, a vehicle dimension limit, a parking rule, and an idling rule.

7. A computer system for incorporating a plurality of cloud-based policies to utilize an autonomous vehicle, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving, by the processor, a location for the autonomous vehicle from a global positioning system;

determining a rule area in which the autonomous vehicle is located, wherein the rule area is a geographic region within a municipality based on the received location;

identifying a traffic rule set associated with the determined rule area, wherein the traffic rule set is a plurality of legal traffic parameters for the determined rule area, and wherein the traffic rule set comprises regional traffic rules, speed limits, and rules regarding autonomous vehicle use;

in response to determining that the identified traffic rule set is not available for the determined rule area;
   transmitting, to a user device, a manual mode alert to a user in a driver's seat of the autonomous vehicle; and
   enabling a manual mode in the autonomous vehicle;

in response to determining that the identified traffic rule set is available for the determined rule area:
   downloading the identified traffic rule set and an available rule set for each rule area surrounding the determined rule area; and
   applying the downloaded traffic rule set to a knowledge base in the autonomous vehicle based on a hierarchical priority ranking of traffic laws; and in response to determining the autonomous vehicle has entered a rule area surrounding the determined rule area, applying the available rule set downloaded for the surrounding rule area.

8. The computer system of claim 7, further comprising:
determining whether the user reached a predetermined destination based on the received location of the autonomous vehicle.

9. The computer system of claim 8, further comprising:
in response to determining the user did not reach the predetermined destination, determining whether the user entered a new rule area.

10. The computer system of claim 7, wherein the rule area includes a type, and wherein the type of rule area is selected from a group consisting of a road, a town, a county, and a state.

11. The computer system of claim 7, wherein the manual mode alert is selected from a group consisting of a verbal alert on at least one autonomous vehicle speaker, a visual alert on an autonomous vehicle dashboard, and a visual alert on a heads-up display.

12. The computer system of claim 7, wherein the traffic rule set includes a subject, and wherein the subject of a traffic rule set is selected from a group consisting of a speed limit, a right-turn-on-red rule, a carpool lane rule, a headlight rule, a vehicle weight limit, a vehicle dimension limit, a parking rule, and an idling rule.

13. A computer program product for incorporating a plurality of cloud-based policies to utilize an autonomous vehicle, the computer program product comprising:
   one or more computer-readable tangible storage medium and program instructions stored on at least one of the one or more tangible storage medium, the program instructions executable by a processor capable of performing a method, the method comprising:
   receiving a location for the autonomous vehicle from a global positioning system;
   determining a rule area in which the autonomous vehicle is located, wherein the rule area is a geographic region within a municipality based on the received location;
   identifying a traffic rule set associated with the determined rule area, wherein the traffic rule set is a plurality of legal traffic parameters for the determined rule area, and wherein the traffic rule set comprises regional traffic rules, speed limits, and rules regarding autonomous vehicle use;

in response to determining that the identified traffic rule set is not available for the determined rule area;
   transmitting, to a user device, a manual mode alert to a user in a driver's seat of the autonomous vehicle; and
   enabling a manual mode in the autonomous vehicle;

in response to determining that the identified traffic rule set is available for the determined rule area:
   downloading the identified traffic rule set and an available rule set for each rule area surrounding the determined rule area; and
   applying the downloaded traffic rule set to a knowledge base in the autonomous vehicle based on a hierarchical priority ranking of traffic laws; and in response to determining the autonomous vehicle has entered a rule area surrounding the determined rule area, applying the available rule set downloaded for the surrounding rule area.

14. The computer program product of claim 13, further comprising:
determining whether the user reached a predetermined destination based on the received location of the autonomous vehicle.

15. The computer program product of claim 14, further comprising:
in response to determining the user did not reach the predetermined destination, determining whether the user entered a new rule area.

16. The computer program product of claim 13, wherein the rule area includes a type, and wherein the type of rule area is selected from a group consisting of a road, a town, a county, and a state.

17. The computer program product of claim 13, wherein the manual mode alert is selected from a group consisting of a verbal alert on at least one autonomous vehicle speaker, a visual alert on an autonomous vehicle dashboard, and a visual alert on a heads-up display.

18. The method of claim 1, further comprising:
in response to determining a current route will enter a rule area that restricts autonomous functionality usage of vehicles, rerouting the autonomous vehicle to a new route through a rule area that permits autonomous vehicle usage.

19. The computer system of claim 7, further comprising:
in response to determining a current route will enter a rule area that restricts autonomous functionality usage of vehicles, rerouting the autonomous vehicle to a new route through a rule area that permits autonomous vehicle usage.

20. The computer program product of claim 13, further comprising:
in response to determining a current route will enter a rule area that restricts autonomous functionality usage of vehicles, rerouting the autonomous vehicle to a new route through a rule area that permits autonomous vehicle usage.

* * * * *